US00RE48361E

(19) United States
(12) Reissued Patent
Hwang et al.

(10) Patent Number: US RE48,361 E
(45) **Date of Reissued Patent: *Dec. 15, 2020**

(54) METHOD AND TERMINAL FOR RANDOM ACCESS TO SMALL CELL

(71) Applicant: LG Electronics Inc., Seoul (KR)

(72) Inventors: Daesung Hwang, Seoul (KR); Hakseong Kim, Seoul (KR); Suckchel Yang, Seoul (KR); Seungmin Lee, Seoul (KR); Hyangsun You, Seoul (KR); Yunjung Yi, Seoul (KR); Dongyoun Seo, Seoul (KR); Hanbyul Seo, Seoul (KR)

(73) Assignee: LG Electronics Inc., Seoul (KR)

( * ) Notice: This patent is subject to a terminal disclaimer.

(21) Appl. No.: 16/270,261

(22) Filed: Feb. 7, 2019

Related U.S. Patent Documents

Reissue of:
(64) Patent No.: 9,462,612
Issued: Oct. 4, 2016
Appl. No.: 14/408,909
PCT Filed: Jun. 12, 2013
PCT No.: PCT/KR2013/005186
§ 371 (c)(1),
(2) Date: Dec. 17, 2014
PCT Pub. No.: WO2014/003339
PCT Pub. Date: Jan. 3, 2014

U.S. Applications:
(63) Continuation of application No. 16/151,789, filed on Oct. 4, 2018, which is an application for the reissue of Pat. No. 9,462,612.
(Continued)

(51) Int. Cl.
*H04B 7/00* (2006.01)
*H04W 74/08* (2009.01)
(Continued)

(52) U.S. Cl.
CPC ..... *H04W 74/0841* (2013.01); *H04L 5/0053* (2013.01); *H04W 36/0005* (2013.01);
(Continued)

(58) Field of Classification Search
CPC ..... H04L 5/0053; H04L 5/0007; H04W 36/0005; H04W 74/0841; H04W 74/002; H04W 36/0077
See application file for complete search history.

(56) References Cited

U.S. PATENT DOCUMENTS 8,265,025 B2 * 9/2012 Imamura ..... H04W 74/0866 370/329
8,432,812 B2 4/2013 Park et al.
(Continued)

FOREIGN PATENT DOCUMENTS

EP 2 309 817 A1 4/2011
JP 2012-080556 A 4/2012
(Continued)

OTHER PUBLICATIONS

3rd Generation Partnership Project; Technical Specification Group Radio Access Network; "Evolved Universal Terrestrial Radio Access (E-UTRA); Physical Channels and Modulation (Release 8)," 3GPP TS 36.211 V8.2.0, Mar. 2008, 65 pages.
(Continued)

*Primary Examiner* — Mark Sager
(74) *Attorney, Agent, or Firm* — Fish & Richardson P.C.

(57) ABSTRACT

The present invention relates to a method for random access to a small cell by means of a terminal. The method can include the steps of: receiving a plurality of settings for a random access preamble; selecting one of the plurality of settings; and transmitting the random access preamble according to the one selected setting. Here, a resource on which the random access preamble can be transmitted can be
(Continued)

provided in plurality in one subframe, and the preamble transmitted on each resource is distinguishable.

15 Claims, 14 Drawing Sheets

Related U.S. Application Data

(60) Provisional application No. 61/664,757, filed on Jun. 27, 2012.

(51) Int. Cl.
*H04L 5/00* (2006.01)
*H04W 36/00* (2009.01)
*H04W 74/00* (2009.01)

(52) U.S. Cl.
CPC ..... *H04W 74/002* (2013.01); *H04L 5/0007* (2013.01); *H04W 36/0077* (2013.01)

(56) References Cited

U.S. PATENT DOCUMENTS 8,611,297 B2 * 12/2013 Noh ..... H04W 74/006 370/329
8,619,613 B2 * 12/2013 Vujcic ..... H04W 74/002 370/252
8,811,311 B2 * 8/2014 Huang ..... H04W 74/08 370/329
9,461,787 B2 10/2016 Ahn et al.
9,807,756 B2 10/2017 Ahn et al.
2009/0186613 A1 * 7/2009 Ahn
2010/0027484 A1 2/2010 Imamura et al.
2010/0232318 A1 * 9/2010 Sarkar ..... H04W 28/18 370/254
2010/0272035 A1 10/2010 Park et al.
2011/0002401 A1 1/2011 Hao et al.
2011/0007673 A1 1/2011 Ahn et al.
2012/0077512 A1 3/2012 Park et al.

FOREIGN PATENT DOCUMENTS

KR 10-2011-0039631 A 4/2011
WO 2010/104977 A1 8/2010
WO WO 2010/104977 A1 9/2010

OTHER PUBLICATIONS

3rd Generation Partnership Project; Technical Specification Group Radio Access Network; "Evolved Universal Terrestrial Radio Access (E-UTRA); Physical Channels and Modulation (Release 8)," 3GPP TS 36.211 V8.7.0, May 2009, 83 pages.
United States Office Action in U.S. Appl. No. 16/151,789, dated Aug. 1, 2019, 14 pages.
United States Office Action in U.S Appl. No. 16/151,789, dated May 21, 2020, 44 pages.

* cited by examiner

Amended

Amended

Amended

Amended

Amended

Amended

Amended

Amended

Amended

Amended

METHOD AND TERMINAL FOR RANDOM ACCESS TO SMALL CELL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is [the] *a continuation reissue application of U.S. patent application Ser. No. 16/151,789, filed Oct. 4, 2018, which is a reissue application of U.S. application Ser. No. 14/408,909, filed on Dec. 17, 2014, now U.S. Pat. No. 9,462,612, issued on Oct. 4, 2016, which is a* National Phase of [PCI] *PCT* International Application No. PCT/KR2013/005186, filed on Jun. 12, 2013, which claims priority under 35 U.S.C. 119(e) to U.S. Provisional Application No. 61/664,757, [flied] *filed* on Jun. 27, 2012, all of which are hereby expressly incorporated by reference into the present application.

BACKGROUND OF THE INVENTION

1. Field of the Invention

The present invention relates to a method and a user equipment for performing random access.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

In general, a terminal performs random access in order to access a network. Random access can be divided into contention-based random access and non-contention-based random access. The greatest difference between contention-based random access and non-contention-based random access is whether or not a random access preamble is dedicated to one terminal. In non-contention-based random access, a contention (or collision) with other terminals is not generated because a terminal uses a dedicated random access preamble designated thereto. Here, a contention means that two or more terminals attempt random access using the same random access preamble through the same resources. In contention-based random access, there is a possibility of a contention because a terminal uses a randomly selected random access preamble.

Random access is performed in order to perform uplink synchronization or to request the allocation of uplink radio resources. For example, after being initially powered on, a terminal can perform downlink synchronization and then perform random access in order to obtain uplink synchronization. For another example, in the state in which a Radio Resource Control (RRC) connection has not been established, a terminal can perform random access in order to have uplink radio resources for uplink transmission allocated thereto. For yet another example, a terminal may perform random access in order to initially access a target base station in a handover process.

Meanwhile, there are disadvantages in considering a cell having very small coverage of which needs has been growing recently, the conventional random access preamble is not proper.

SUMMARY OF THE INVENTION

The present specification introduces a PRACH preamble of new format, and to provide various methods for using the PRACH preamble of new format.

To achieve the objection, according to the one embodiment of the present specification, there is provided a method for performing random access by a user equipment for a small cell. The method may comprise: receiving a plurality of configurations for a random access preamble; selecting one of the plurality of configurations; and transmitting the random access preamble according to a selected configuration. The random access preamble is transmitted on at least one resource in a subframe including plural resources on which the random access preamble is capable of being transmitted. And a preamble transmitted on each resource is uniquely distinguishable.

Locations of the plurality of resources may be aligned with a boundary of the subframe. Alternatively, locations of the plurality of resources may be aligned with a boundary of each slot in the subframe. Also, locations of the plurality of resources may be aligned with a boundary of a group of OFDMA or SC-FDMA symbols.

The method may further comprise: receiving a random access response including RA-RNTI. Here, the RA-RNTI may be calculated by a location index of the resource within a subframe index on which the preamble is transmitted and the subframe.

A length of the random access preamble transmitted on the resource may be shorter than a length of 3 OFDMA or SC-FDMA symbols in case of normal CP, and may be shorter than a length of 2 OFDMA or SC-FDMA symbols in case of extended CP.

The plurality of configurations may be received through system information. And, the plurality of configurations may include a configuration of format 0 to 4 for PRACH preamble and a configuration of new format which is different from the format 0 to 4.

The new format may be generated based on format 4 for PRACH preamble.

In selection step, the user equipment preferentially may selects configuration of new format.

The subframe may be downlink subframe. The small cell may be a pico cell, femto cell, Home (e)NodeB or CSG cell To achieve the objection, according to the one embodiment of the present specification, there is provided a user equipment (UE) for performing random access for a small cell. The UE may comprise: a radio frequency (RF) unit configured to receive a plurality of configurations for random access preamble; and a processor configured to control the RF unit, to select one of the plurality of configurations and to transmit the random access preamble according to the selected configuration. The random access preamble is transmitted on at least one resource in a subframe including plural resources on which the random access preamble is capable of being transmitted. A preamble transmitted on each resource is uniquely distinguishable

ADVANTAGEOUS EFFECTS

According to the disclosure of the present specification, when performing random access for the purpose of initial access, handover, uplink synchronization, etc for a small cell of which coverage radius is small, for example, a pico cell, by transmitting the PRACH preamble of new format, the overhead can be decreased. In addition, even in case of a macro cell, the overhead can be decreased efficiently by using the PRACH preamble of new format.

DESCRIPTION OF EXEMPLARY EMBODIMENTS

Figure 1:
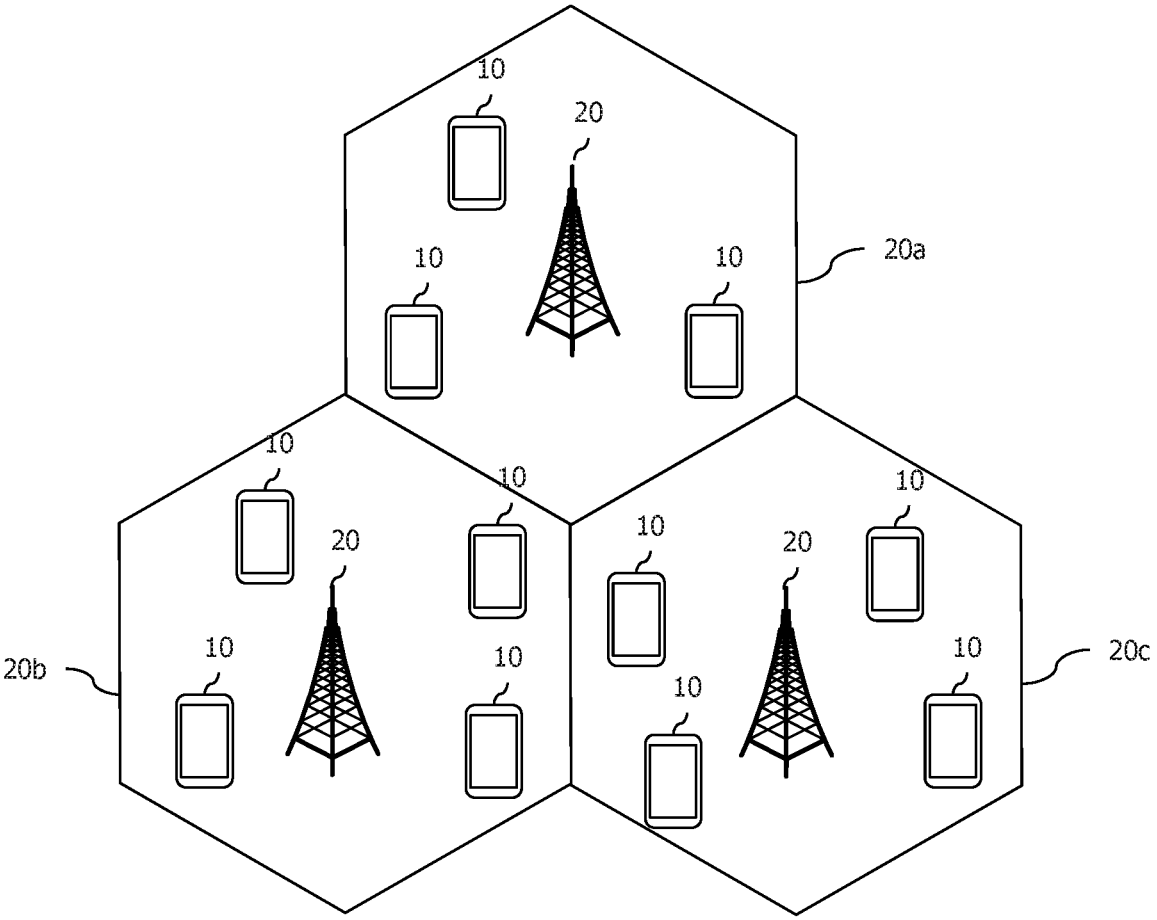
FIG. 1 Prior Art
FIG. 1 illustrates a wireless communication system.

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

A wireless device may be fixed or mobile, and may be referred to as another terminology, such as a terminal, a mobile terminal (MT), a user equipment (UE), a mobile equipment (ME), a mobile station (MS), a user terminal (UT), a subscriber station (SS), a handheld device, an access terminal (AT), etc.

A base station (BS) is generally a fixed station that communicates with the UE and may be referred to as another terminology, such as an evolved Node-B (eNB), a base transceiver system (BTS), an access point, etc.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (WiFi), IEEE 802.16 (WiMAX), IEEE 802.20, evolved UTRA (E-UTRA), etc. IEEE 802.16m is evolved from IEEE 802.16e, and provides backward compatibility with an IEEE 802.16e-based system. The UTRA is a part of a universal mobile telecommunication system (UMTS). 3rd generation partnership project (3GPP) long term evolution (LTE) is a part of an evolved UMTS (E-UMTS) using the E-UTRA.

The 3GPP LTE uses the OFDMA in a downlink and uses the SC-FDMA in an uplink. LTE-advanced (LTE-A) is evolved from the 3GPP LTE.

Although the case of LTE-A is mainly described herein for the clarity of description, the inventive concept is not limited thereto.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors). A terminal (user equipment, UE) 10 may be fixed or movable and may be called other terms such as a mobile station (MS), a mobile terminal (MT), a user terminal (UT), a subscriber station (SS), a wireless device, a personal digital assistant (PDA), a wireless modem, a handheld device, and the like. The base station 20 generally represents a fixed station that communicates with the terminal 10, and may be called different terms such as an evolved-NodeB (eNB), a base transceiver system (BTS), an access point, and the like.

The terminal generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the terminal.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
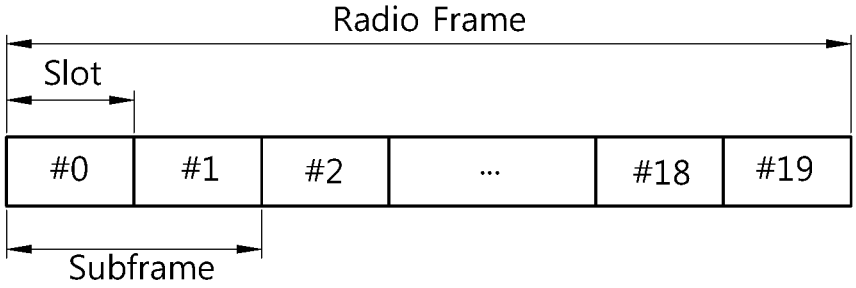
FIG. 2 Prior Art
FIG. 2 shows a downlink radio frame structure in 3rd generation partnership project (3GPP) long term evolution (LTE).

FIG. 2 Shows a Downlink Radio Frame Structure in 3rd Generation Partnership Project (3GPP) Long Term Evolution (LTE).

The section 5 of 3GPP TS 36.211 V8.2.0 (2008-03) "Evolved Universal Terrestrial Radio Access (E-UTRA); Physical Channels and Modulation (Release 8)" may be incorporated herein.

Referring to FIG. 2, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Although it is described that one slot includes plural OFDM symbols for example, the number of OFDM symbols included in one slot may vary depending on a length of a cyclic prefix (CP).

Figure 3:
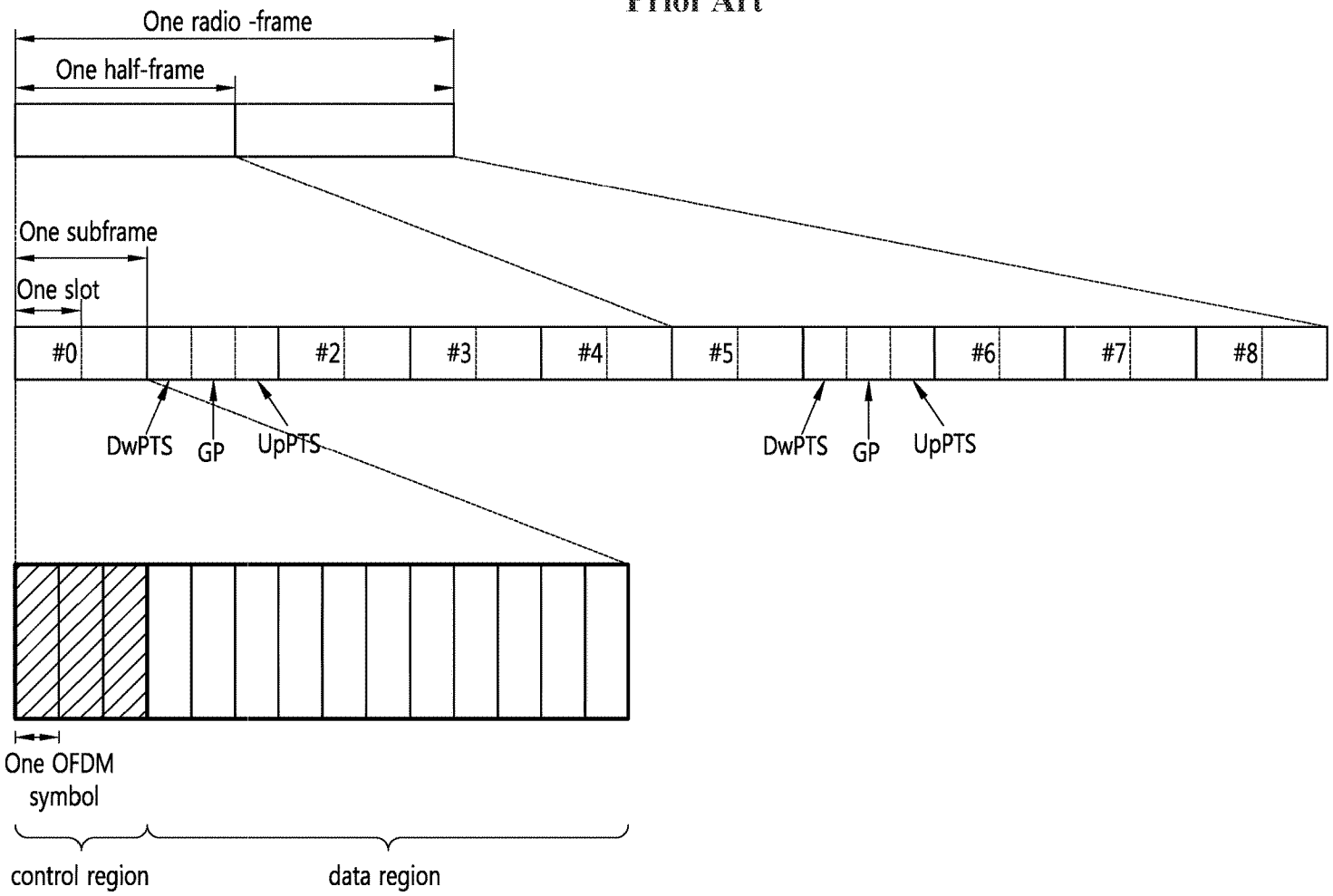
FIG. 3 Prior Art
FIG. 3 shows a downlink radio frame structure according to TDD in 3GPP LTE.

FIG. 3 Shows a Downlink Radio Frame Structure According to TDD in 3GPP LTE.

The section 4 for TDD of 3GPP TS 36.211 V8.7.0 (2009-05) "Evolved Universal Terrestrial Radio Access (E-UTRA); Physical Channels and Modulation (Release 8)" may be incorporated herein.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and a downlink In TDD, a downlink (DL) subframe and an uplink (UL) subframe co-exist in one radio frame. Table 1 shows an example of a configuration of the radio frame.

TABLE 1

| UL-DL Configuration | Switch-point periodicity | Subframe index 0 | 1 | 2 | 3 | 4 | 5 | 6 | 7 | 8 | 9 |
|---|---|---|---|---|---|---|---|---|---|---|---|
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe, and 'S' denotes a special subframe. When the UL-DL configuration is received from the BS, the UE can know whether a specific subframe is the DL subframe or the UL subframe according to the configuration of the radio frame.

A DL subframe is divided into a control region and a data region in the time domain. The control region includes up to three preceding OFDM symbols of a 1st slot in the subframe. However, the number of OFDM symbols included in the control region may vary. A physical downlink control channel (PDCCH) and other control channels are allocated to the control region, and a physical downlink shared channel (PDSCH) is allocated to the data region.

Figure 4:
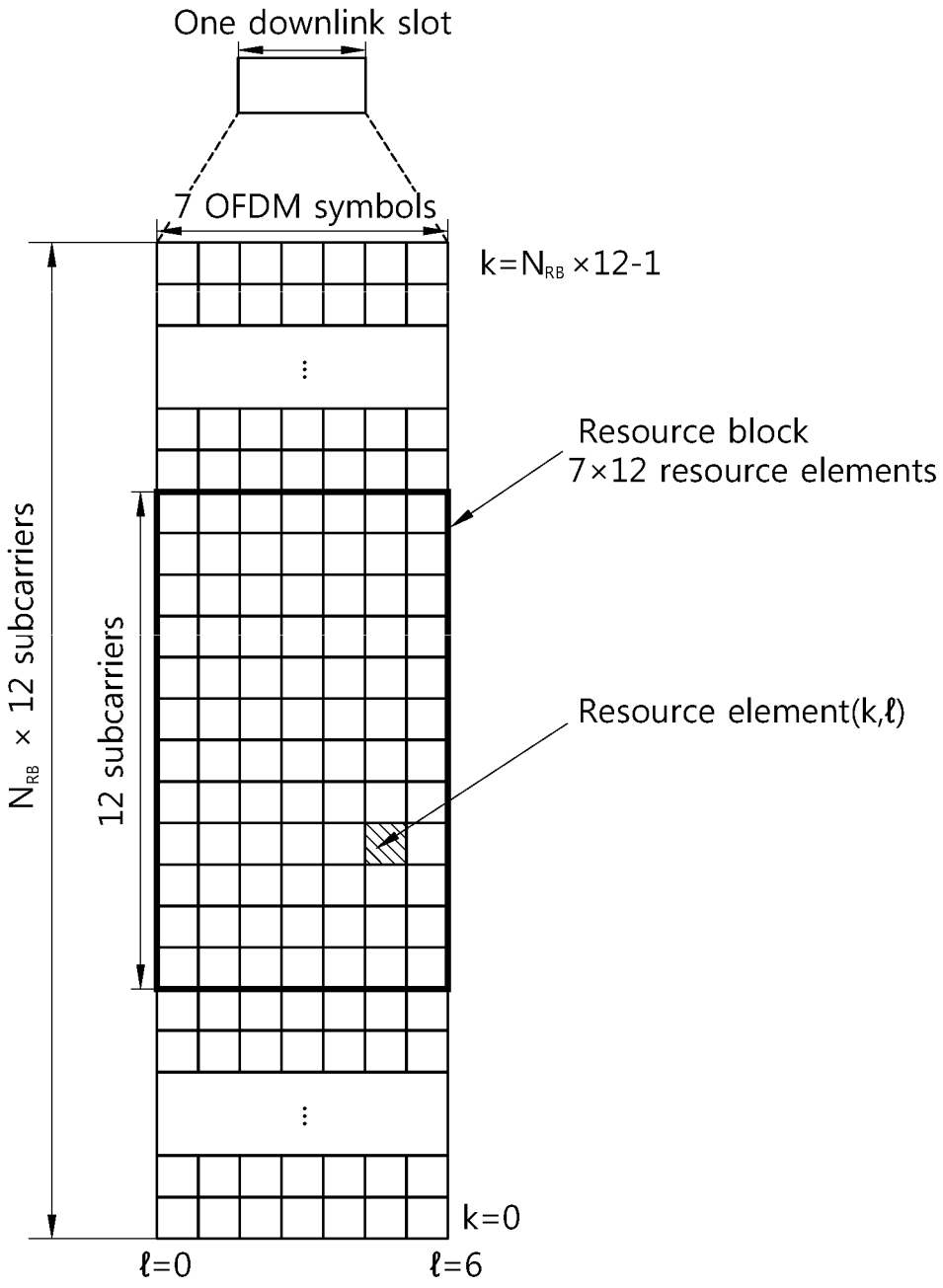
FIG. 4 Prior Art
FIG. 4 illustrates an example resource grid for one uplink or downlink slot in 3GPP LTE.

FIG. 4 Illustrates an Example Resource Grid for One Uplink or Downlink Slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
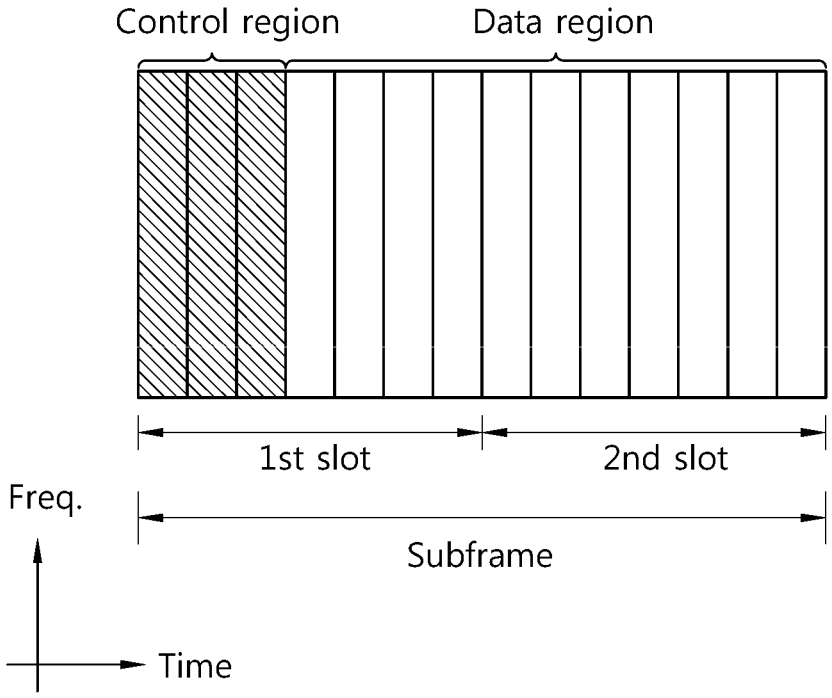
FIG. 5 Prior Art
FIG. 5 illustrates the architecture of a downlink sub-frame.

FIG. 5 Illustrates the Architecture of a Downlink Sub-Frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 6:
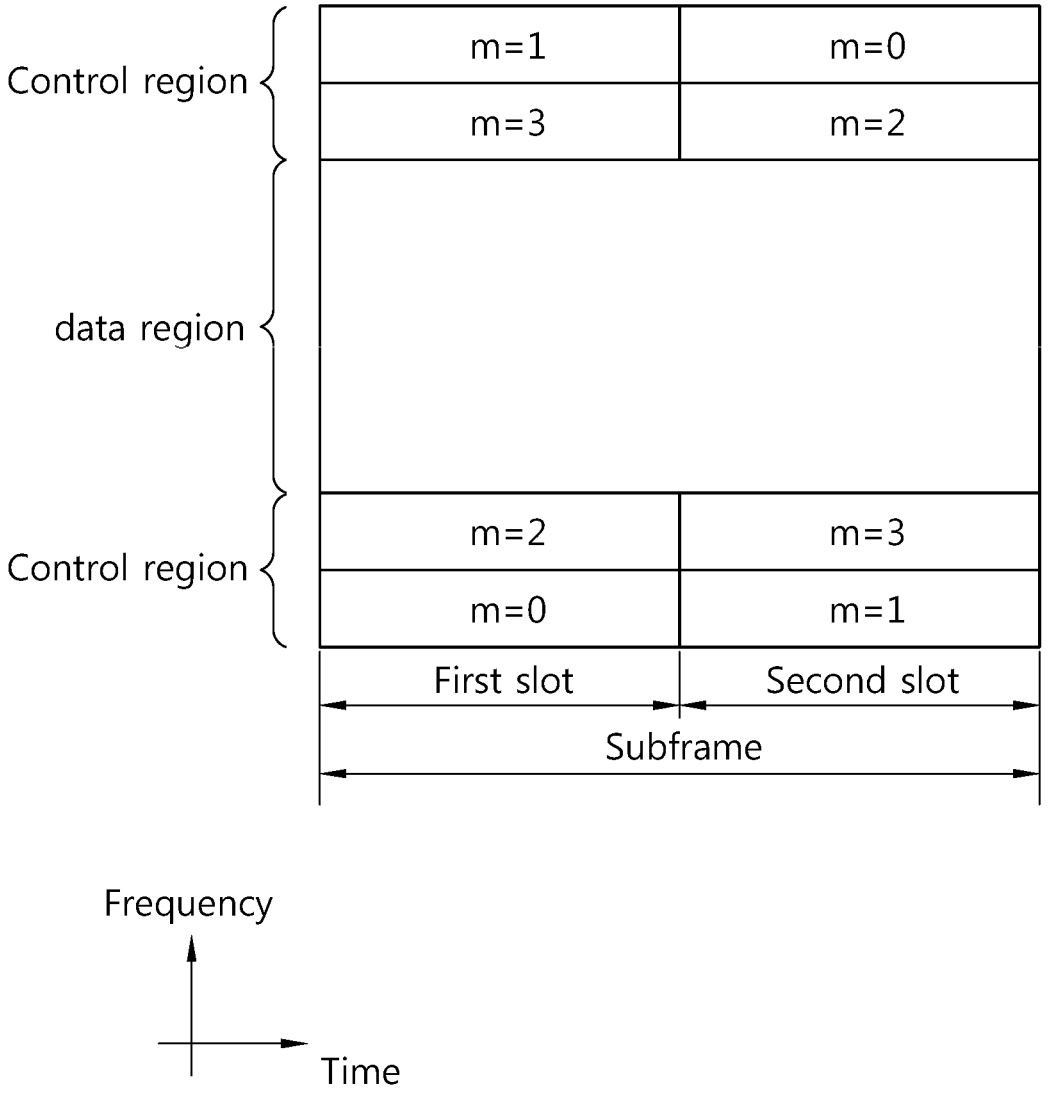
FIG. 6 Prior Art
FIG. 6 illustrates the architecture of an uplink sub-frame in 3GPP LTE.

FIG. 6 Illustrates the Architecture of an Uplink Sub-Frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Figure 7:
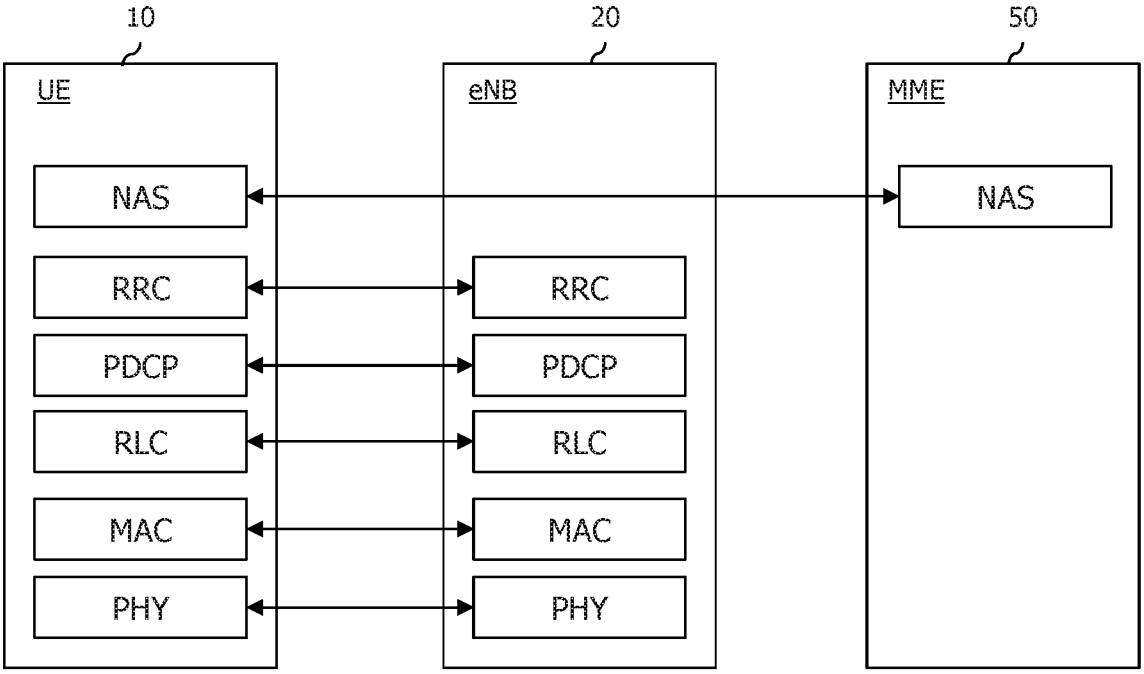
FIG. 7 Prior Art
FIG. 7 is a block diagram illustrating the radio protocol architecture.

FIG. 7 is a Block Diagram Illustrating the Radio Protocol Architecture.

The data plane is a protocol stack for user data transfer and the control plane is a protocol stack for control signal transfer.

Referring to FIG. 7, the physical layer (PHY) provides upper-layer with information transfer service by using the physical channel. The physical layer is connected through transport channel unlike MAC (Medium Access Control) layer, the upper-layer. Data is transferred through transport channel between MAC layer and physical layer. The transport channels are classified according to how data is transferred with characteristics through radio interface.

Data is transferred between different physical layers, in other words, data is transferred through physical channel between the physical layers of the transmitter and receiver. The physical channel can be modulated by OFDM (Orthogonal Frequency Division Multiplexing) method, and time and frequencies are used as wireless resources.

The functions of MAC layer include mapping between the logical channel and transport channel, and multiplexing/inverse-multiplexing to the transport block provided via physical channel onto the transport channel of MAC SDU (service data unit) belonging to the logical channel. MAC layer provides service to RLC (Radio Link Control) layer through logical channel.

Functions of RLC layer include concatenation, segmentation and reassembly of RLC SDUs. In order to ensure various QoS (Quality of Service) required by Radio Bearer (RB), the RLC layer provides three operation mode of transparent mode (TM), Unacknowledged Mode (UM) and Acknowledged Mode (AM). AM RLC provides error correction through ARQ (automatic repeat request).

Functions of PDCP (Packet Data Convergence Protocol) layer on user plane include transfer of user data, header compression and ciphering. Functions of PDCP (Packet Data Convergence Protocol) layer on user plane include transfer of control plane data and ciphering/integrity protection.

RRC (Radio Resource Control) layer is only defined on control plane. RRC layer performs the task of configuration of radio bearers, re-configuration and control of logical channel, transport channel and physical channel in relation to release. RB means a logical path which is provided by the 1st layer (PHY layer) and 2nd layer (MAC layer, RLC layer and PDCP layer) to transfer data between the UE and network.

The process of configuring RB means that characteristics of radio protocol layer and channel are specified for providing specific service and specific parameters and operation methods are configured for each service. RB is then divided into two types of SRB (Signaling RB) and DRB (Data RB). SRB is used as a passage for transferring RRC message on the control plane, and DRB is used as a passage for transferring user data on the user plane.

When RRC connection (RRC Connection) is established between the RRC layer of the UE and RRC layer of E-UTRAN, the UE can be in RRC connected state, or otherwise in RRC idle state.

As for downlink transport channels, which transfer data from network to the UE, there is BCH (Broadcast Channel) which transfers system information, and downlink SCH (Shared Channel) which transfers other information such as user traffic or control message. In the case of traffic or control message of downlink multicast or broadcast service, transfer can be performed through downlink SCH or through separate downlink MCH (Multicast Channel). Meanwhile, as for uplink transport channels, which transfer data from the UE to network, there are RACH (Random Access Channel) which transfers initial control message, and uplink SCH (Shared Channel) which transfers other information such as user traffic or control message.

As for logical channels, which is above the transport channel and are mapped to the transport channel, there are BCCH (Broadcast Control Channel), PCCH (Paging Control Channel), CCCH (Common Control Channel), MCCH (Multicast Control Channel), MTCH (Multicast Traffic Channel), etc.

The physical channel consists of multiple OFDM symbols in time domain and multiple sub-carrier in frequency domain. A sub-frame consists of multiple OFDM Symbols in time domain. The resource block is a unit of resource allocation and consists of multiple OFDM symbols and multiple sub-carriers. Also, each sub-frame can use specific sub-carriers of specific OFDM symbols (e.g., the 1st OFDM symbol) of corresponding sub-frame for PDCCH (Physical Downlink Control Channel) i.e. for L1/L2 control channel. TTI (Transmission Time Interval) is a unit time for sub-frame transfer.

The RRC state of the UE and the method of RRC connection will be described below.

RRC state means whether the RRC layer of the UE is logically connected with the RRC layer of E-UTRAN or not, and is called to be in RRC connection state when connection is established, or in RRC IDLE STATE when connection is not established. The UE in RRC connection state can be identified by E-UTRAN since there exists RRC connection, and therefore effective control of the UE is possible. On the other hand, the UE in RRC IDLE STATE cannot be identified by E-UTRAN, and is controlled by CN (core network) in the unit of Tracking Area which is larger unit of area than the cell. In other words, the UE in RRC IDLE STATE is only identified in the unit of large area and so should transit to RRC connection state to receive conventional mobile communication service such as voice and data.

When a user first turns the UE on, the UE first searches appropriate cell and stays in corresponding cell in RRC IDLE STATE. The UE in RRC IDLE STATE establishes RRC connection with E-UTRAN through RRC connection procedure when there needs RRC connection, and transit to RRC connection state. The UE in RRC IDLE STATE needs RRC connection for various reasons such as the need for uplink data transfer to try to call by the user or, when paging message is received from E-UTRAN, transfer of response message.

NAS (Non-Access Stratum) layer, which is above RRC layer, performs the function such as session management and mobility management.

Two states, EMM-REGISTERED (EPS Mobility Management-REGISTERED) and EMM-DEREGISTERED are defined to manage the mobility of UE in NAS layer, and two states are applied to the UE and MME. Initially, the UE is in EMM-DEREGISTERED state, and the UE performs the process of registering to corresponding network through the process of Initial Attach to access to the network. If the Attach process is successfully performed, the UE and MME are in EMM-REGISTERED state.

In order to manage signaling connection between the UE and EPC, two states are defined, ECM (EPS Connection Management)-IDLE state and ECM-CONNECTED, which are applied to the UE and MME. When a UE on ECM-IDLE state establishes RRC connection with E-UTRAN, corresponding UE is in the state of ECM-CONNECTED. When MME in ECM-IDLE state establishes S1 connection with E-UTRAN, it is in the state of ECM-CONNECTED. When the UE is not in ECM-IDLE state, E-UTRAN does not have context information of the UE. Therefore, the UE in ECM-IDLE state performs the process related to mobility, e.g. cell selection or cell reselection, on its own base without requiring command from the network. When the UE is in ECM-CONNECTED state, however, the mobility of the UE is controlled by the command from the network. When the location of the UE in ECM-IDLE state is changed from what is known to the network, the UE notifies the network of its location through Tracking Area Update procedure.

Now, system information will be described.

System information includes basic information the UE should know for accessing the base station. Therefore, the UE should receive all the system information to access the base station, and have most recent system information. Since the system information is information that every UE in corresponding cell should know, the base station periodically transmits the system information.

According to section 5.2.2 of 3GPP TS 36.331 V8.7.0 (2009-09) "Radio Resource Control (RRC); Protocol specification (Release 8)", the system information is divided into MIB (Master Information Block), SB (Scheduling Block) and SIB (System Information Block). MIB enables the UE to recognize physical construction of corresponding cell such as bandwidth. SB informs transfer information of SIB such as transfer period. SIB is a set of relevant system information. For example, some SIBs only include information of neighboring cells, and other SIBs only include the information of uplink radio channel the UE uses.

A BS transmits a paging message in order to inform UE whether or not system information has been changed. In this case, the paging message can include a system information change indicator. UE receives a paging message according to paging discontinuous reception (DRX). If the paging message includes a system information change indicator, the UE receives system information that is transmitted through a BCCH, that is, a logical channel.

Random access is described below. Random access is used for UE to obtain uplink synchronization with a BS or to have uplink radio resources allocated thereto. After being powered on, UE initially obtains downlink synchronization with a cell and receives system information. Furthermore, the UE obtains a set of available random access preambles and information about radio resources used to transmit random access preambles from the system information. The radio resources used to transmit random access preambles can be specified as a radio frame and/or a set of one or more subframes. The UE transmits random access preambles randomly selected from the set of random access preambles. The BS that has received the random access preambles sends a Timing Alignment (TA) value for uplink synchronization to the UE through a random access response. Accordingly, the UE obtains uplink synchronization.

That is, the BS allocates a dedicated random access preamble to a specific UE, and the UE performs non-contention random access by using the corresponding random access preamble. That is, in the process of selecting the random access preamble, there may exist the contention based random access in which the UE uses by arbitrary selecting one among a specific set and the non-contention random access that uses the random access preamble allocated to the specific UE by the BS. The non-contention random access may be used for the process of handover or in case of being requested by an order of BS.

Figure 8:
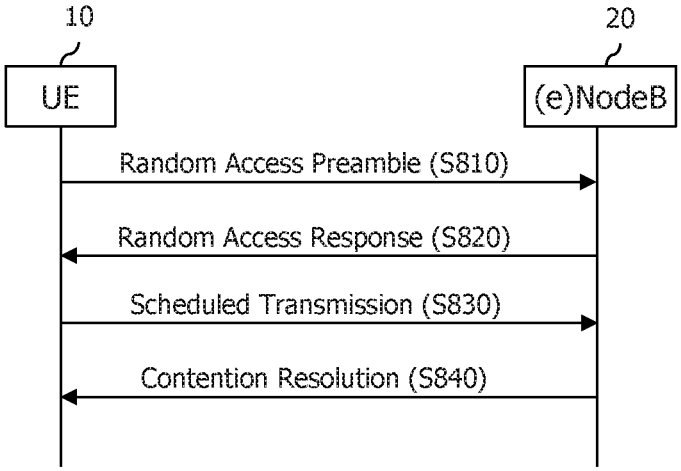
FIG. 8 Prior Art
FIG. 8 is a diagram showing a contention-based random access method.

FIG. 8 is a Diagram Showing a Contention-Based Random Access Method.

Referring to FIG. 8, UE randomly selects one random access preamble from a set of random access preambles indicated by system information or a handover command. Furthermore, the UE selects radio resources through which the random access preamble can be transmitted and transmits the selected random access preamble (S810). The radio resources can be a specific subframe, which may be for selecting a physical random access channel (PRACH).

After transmitting the random access preamble, the UE attempts to receive a random access response within a random access response reception window indicated by the system information or the handover command and thus receives a random access response (S820). The random access response is transmitted in an MAC PDU format, and the MAC PDU can be transmitted through a Physical Downlink Shared Channel (PDSCH). Furthermore, a Physical Downlink Control Channel (PDCCH) is also transferred to the UE so that the UE may properly receive information transferred through the PDSCH. That is, the PDCCH includes information about the UE that receives the PDSCH, information about the frequency and time of radio resources of the PDSCH, and the transport format of the PDSCH, etc. If the UE successfully receives the PDCCH transferred thereto, the UE properly receives the random access response that is transmitted through the PDSCH based on the PDCCH information.

The random access response can include a random access preamble ID, an UL grant (uplink radio resources), a temporary Cell-Radio Network Temporary Identifier (C-RNTI), and a Time Alignment Command (TAC). Since one random access response can include random access response information for one or more pieces of UE, a random access preamble ID can be included in order to inform that an UL grant, a temporary C-RNTI, and a TAC included in the random access response are valid for what UE. The random access preamble ID can be an ID of a random access preamble received by an eNode B. The TAC can be included as information on which the UE coordinates uplink synchronization. The random access response can be indicated by a random access ID on a PDCCH, that is, a Random Access-Radio Network Temporary Identifier (RA-RNTI).

When the UE receives a random access response valid for the UE, the UE processes information included in the random access response and performs transmission scheduled for the eNode B (S830). That is, the UE applies the TAC and stores a temporary C-RNTI. Furthermore, the UE transmits data stored in the buffer of the UE or newly generated data to the eNode B using an UL grant. In this case, the data needs to include information on which the UE can be identified. This is because the eNode B is unaware that what pieces of UE perform random access in a contention-based random access process. Thus, it is necessary to identify the UE for a subsequent contention resolution.

A method of including information capable of identifying UE includes two types of methods. If the UE has already had a valid cell ID allocated thereto in a corresponding cell before performing random access, the UE transmits its own cell ID through an UL grant. In contrast, if a valid cell ID has not been allocated to the UE prior to a random access process, the UE transmits data including its own unique ID (e.g., an S-TMSI or a random ID). In general, the unique ID is longer than a cell ID. If the UE has transmitted the data through the UL grant, the UE starts a timer for a contention resolution (contention resolution timer).

After the UE receives the random access response and transmits the data including its own ID through the allocated UL grant, the UE waits for an instruction from the eNode B for a contention resolution (S840). That is, the UE attempts to receive a PDCCH in order to receive a specific message. Two types of methods can be proposed as a method of receiving a PDCCH. If its own ID transmitted through the UL grant as described above is a cell ID, the UE can attempt to receive a PDCCH using its own cell ID. In this case, if the UE receives a PDCCH through its own cell ID before the contention resolution timer expires, the UE determines that the random access has been normally performed and terminates the random access. If the ID transmitted through the UL grant is a unique ID, the UE attempts to receive a PDCCH using a temporary C-RNTI included in the random access response. In this case, if the UE has received a PDCCH through a temporary cell ID before the contention resolution timer expires, the UE checks data transferred through a PDSCH indicated by the PDCCH. If its own unique ID is included in the data, the UE can determine that the random access has been normally performed and terminate the random access.

Figure 9:
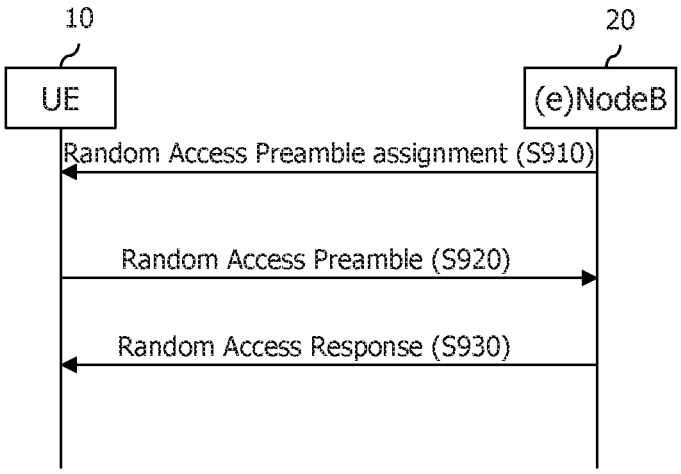
FIG. 9 Prior Art
FIG. 9 is a diagram showing a non-contention-based random access method.

FIG. 9 is a Diagram Showing a Non-Contention-Based Random Access Method.

Unlike the contention-based random access, non-contention-based random access can be terminated when UE receives a random access response.

Non-contention-based random access can be initiated in response to handover and/or a request, such as a command from an eNode B. In the two cases, contention-based random access can be performed.

UE receives a designated random access preamble without a contention possibility from an eNode B. The allocation of the random access preamble may be performed in response to a handover command and a PDCCH command (S910).

After the random access preamble designated to the UE is allocated to the UE, the UE transmits the corresponding random access preamble to the eNode B (S920).

When the random access preamble is received, the eNode B transmits a random access response to the UE as a response (S930). For a procedure related to the random access response, reference can be made to S820 of FIG. 8.

A method for a contention resolution in random access is described below.

The reason why a contention is generated in performing random access is that the number of random access preambles is basically limited. That is, since an eNode B cannot assign UE-unique random access preambles to all pieces of UE, UE randomly selects one of common random access preambles and transmits the selected random access preamble. Accordingly, two or more pieces of UE may select the same random access preamble and transmit the selected random access preamble through the same radio resources (PRACH resources), but an eNode B determines the received random access preamble to be one random access preamble received from one piece of UE. For this reason, the eNode B transmits a random access response to UE and expects that the random access response will be received by one piece of UE. However, since a contention can occur as described above, the two or more pieces of UE receive the one random access response, and thus each of the pieces of UE performs an operation according to the reception of the random access response. That is, there is a problem in that the two or more pieces of UE transmit different data through the same radio resources using one UL grant included in the random access response. As a result, the transmission of the data may all fail, and the eNode B may receive only the data of specific UE depending on the locations or transmission power of the pieces of UE. In the latter case, since all the two or more pieces of UE assume that the transmission of their own data has been successful, the eNode B needs to inform pieces of UE that have failed in the contention of information about the failure. That is, to inform information about the failure or success of a contention is called a contention resolution.

A contention resolution method includes two types of methods. One method includes a method using a contention resolution timer (hereinafter called a CR timer), and the other method is a method of transmitting an ID of successful UE to pieces of UE. The earlier case is used when UE already has a unique cell ID (C-RNTI) prior to a random access process. That is, UE already having a cell ID transmits data, including its own cell ID, to an eNode B in response to a random access response, and actuates a CR timer. If PDCCH information including its own cell ID is received before the CR timer expires, the UE determines that it has been successful in a contention and normally terminates random access. If the UE has not received a PDCCH including its own cell ID before the CR timer expires, however, the UE determines that it has failed in a contention and may perform a random access process again or inform a higher layer of the failure fact. From among the contention resolution methods, the latter case, that is, a method of transmitting an ID of UE, is used when UE does not have a unique cell ID prior to a random access process. That is, if UE does not have its own cell ID, the UE transmits data, including an ID (S-TMSI or random ID) higher than a cell ID, based on UL grant information included in a random access response and actuates a CR timer. If the UE receives data including its own higher ID through a DL-SCH before the CR timer expires, the UE determines that a random access process has been successful. In contrast, if the UE has not received data including its own higher ID through a DL-SCH before the CR timer expires, the UE determines that a random access process has failed.

Figure 10:
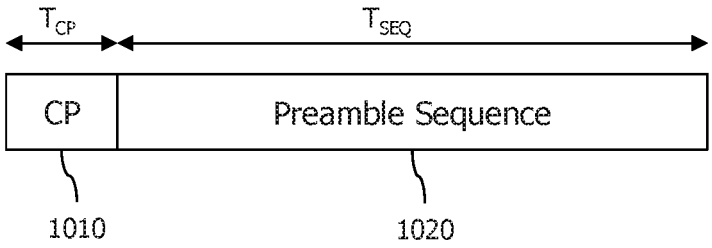
FIG. 10 Prior Art
FIG. 10 is a diagram showing the structure of a random access preamble.

FIG. 10 is a Diagram Showing the Structure of a Random Access Preamble.

Referring to FIG. 10, the random access preamble includes a cyclic prefix (CP) 510 and a preamble sequence 1020. The length of the cyclic prefix can be represented as TCP, and the length of the preamble sequence can be represented as TSEQ.

The random access preamble may have a different format depending on a frame structure and a random access configuration. For this, reference can be made to Table 2 below. In Table 2, Ts indicates a basic time unit.

TABLE 2

| Preamble format | $T_{CP}$ | $T_{SEQ}$ |
|---|---|---|
| 0 | $3168 \cdot T_S$ | $24576 \cdot T_S$ |
| 1 | $21024 \cdot T_S$ | $24576 \cdot T_S$ |
| 2 | $6240 \cdot T_S$ | $2 \cdot 24576 \cdot T_S$ |
| 3 | $21024 \cdot T_S$ | $2 \cdot 24576 \cdot T_S$ |

In case that transmission of the random access preamble is triggered by MAC layer, the transmission of random access preamble is limited to a specific time and frequency resource. Such a resource is listed in ascending order in physical resource block in subframe number and frequency domain of a radio frame.

For preamble format 0 to 3, for example, in the frame structure according to FDD depicted in FIG. 2, a random access resource per a subframe may be existed. Table 3 below represents the subframe in which the random access preamble permitted for given configuration in the frame structure according to FDD is permitted.

The random access preamble may be defined by a Zadoff-Chu (ZC) sequence as follows.

$$x(n)e^{-\frac{\pi kn(n+1)}{N}} \quad \text{[Equation 1]}$$

Herein, k denotes a root index, and N denotes a length of the sequence, where 0<=n<=(N−1).

TABLE 3

| PRACH configuration index | Preamble format | System frame number | Subframe number |
|---|---|---|---|
| 0 | 0 | Even | 1 |
| 1 | 0 | Even | 4 |

TABLE 3-continued

| PRACH configuration index | Preamble format | System frame number | Subframe number |
|---|---|---|---|
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6 ,9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

Referring to Table 3 above, the available UL radio resource for random access may be specified according to a preamble format, a system frame number and a subframe number, and the specified UL radio resource may be indexed by the PRACH configuration index.

The preamble format is configured as a value that indicates five sort of random access preamble formats described above with reference to Table 2. The preamble format may have a value of 0 to 3. The preamble format may be determined according to cell environment, network state, etc. Preamble format 0 may be used for normal environment. Preamble format 1 may be used for the case in which time retard is significant such as the cell environment of big radius. Preamble format 2 is for the case of sending sequence repeatedly in considering the situation in which signal to interference noise ratio (SINR) is low, and may be used for the case in which cell radius is within 30 km. Preamble format 3 is for the case of sending sequence repeatedly in considering the situation in which SINR is low, and may be used for the case in which cell radius is within 100 km.

The system frame number may be configured as a value for specifying a radio frame that may be used as the PRACH which is a radio resource for random access among the above described radio frames. The system frame number may be configured to indicate that any radio frames may be used for random access and/or a radio frame having a specific index such as even numbers may be used for random access.

The subframe number may be configured to indicate an index number of the subframe which may be used for random access within a radio frame. The number of subframe that can be used as the PRACH for random access within a radio frame may be one or more.

An available subframe for transmitting random access preamble may be allocated to a UE through the UL radio resource information which is included in the system information and the UE may verify it. For example, when the UE receives an available UL radio resource information which is configured to indicate '8' as a PRACH configuration index, the UE may identify that the random access preamble may be transmitted through number '3' and '8' of all radio frames. In this case, number '0' format may be used as the preamble format.

As described so far, in the conventional 3GPP LTE, the PRACH operation is performed for the purposed of initial access, handover, or UL synchronization of a terminal, that is, a UE. Meanwhile, as described above, there exist formats 0 to 3 in the PRACH preamble in case of FDD, and format 0 to 4 in case of TDD. Each PRACH preamble format is designed for the purpose of the various coverage radii of cells which are different from each other and the maximum delay spread, and an eNodeB may select a PRACH preamble format according to a state of cell and a wireless communication environment. In the above description, in case that cell coverage radii of preamble formats 0 to 3 are 14 km, 77 km, 29 km and 100 km, the preamble sequence is designed to support them.

However, in the next system after LTE-A, for the purpose of increasing system capacity, etc., an access to a cell of which cell radius is small such as a pico cell and a carrier aggregation for the cell can be considered.

However, in such a small cell, that is, pico cell environment, there is a problem that the existing PRACH preambles 0 to 3 have overhead which is more than needed. Meanwhile, in case of PRACH preamble format 4, since cell coverage is designed to support 1.4 km, it seems to be proper as the PRACH preamble for pico cell. However, in the conventional 3GPP, the PRACH resource which is available to transmit the PRACH and is restricted only for TDD is also limited to a special subframe of which number of OFDM symbol is 2 that corresponds to UpPts.

Also, in case of the cell that has very small coverage of which needs has been growing recently, there may be problem in which overhead is higher than needed, even in case of PRACH preamble format 4.

Accordingly, in the present invention, in considering a cell that has very small coverage of which needs has been growing recently, a new format of PRACH preamble is suggested, and further, a method for allocating resources for the new format of PRACH is also suggested. The new format of PRACH preamble suggested in the present specification may be generated based on the existing PRACH preamble format 4 or generated in entirely new form. First, the generation of new PRACH preamble will be described based on the existing PRACH preamble format 4.

<A New Format of PRACH Preamble Based on the Existing PRACH Preamble Format 4>

The existing PRACH preamble format 4 may be transmitted in a special subframe of which number of OFDM symbol that corresponds to UpPts in TDD are 2. Also, in the existing PRACH preamble format 4, a guard time (GT) is basically designed to support cell coverage of 1.4 km, and a CP length is designed to support propagation delay for cell coverage radius of 1.4 km and delay spread of 5.4 μs. That is, a length of preamble according to existing PRACH preamble format 4 is 4832 $T_s$ including GT, which is designed to be shorter than 3 OFDM symbols based on normal CP and shorter than total length of 2 OFDM symbols based on extended CP. As such, since PRACH preamble format 4 has short sequence length and small resource occupied basically, according to an embodiment suggested by the present specification, a new format of PRACH preamble is generated based on such PRACH preamble format 4.

As described above, according to an embodiment suggested by the present specification, based on sequence of 139 length according to PRACH preamble format 4, a new format of PRACH preamble for a pico cell that has very small coverage of which needs has been growing recently may be generated. The new format of PRACH preamble may allocate resources such that it may also be transmitted in a normal subframe as well as in a special subframe in case of TDD, and may also be used in case of FDD.

In addition, in case of being based on PRACH preamble format 4, since the PRACH preamble is transmitted during a time duration that corresponds to a part of OFDM symbols, total number of UL subframes which are required for a plurality of PRACH preambles may be decreased by a plurality of the new format of PRACH formats in a subframe being transmitted. Meanwhile, the PRACH preamble may be transmitted with being tuned on synchronization of DL. However, if the sorts of CPs used between DL and UL are different, in order to transmit a plurality of PRACH preambles in a subframe in TDM method, a resource for the PRACH preamble is required to be aligned with a specific reference point. That is, as such, in order to transmit a plurality of PRACH preambles in a subframe, synchronization of subframes, slots, or the unit of symbols may be required.

FIGS. 11a Through 11d are an Exemplary View Illustrating a Structure of a New PRACH Preamble According to an Embodiment Suggested in the Present Specification.

The new PRACH preamble format as depicted in FIGS. 11a through 11d may be defined based on the existing PRACH preamble format 4.

Figure 11A:
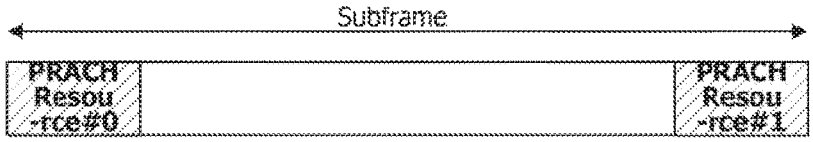
FIGS. 11a through 11d are an exemplary view illustrating a structure of a new PRACH preamble according to an embodiment suggested in the present specification.

Specifically, referring to FIG. 11a, a resource for the new format of PRACH preamble may be aligned with boundaries of both sides of subframe, and accordingly, 2 PRACH preambles of new format may be transmitted in a subframe. The resource for a first PRACH preamble of new format may be aligned such that it is started from a point where the subframe is started. And an end point of the resource for a second PRACH preamble of new format may be aligned with a point where the subframe is ended. That is, the resource for the second PRACH preamble of new format may be aligned such that is started from a region forgoing as much as a PRACH preamble length including GT from a point where the corresponding subframe is ended. Herein, the PRACH preamble length of new format may be 4832 $T_s$ based on PRACH preamble format 4 in case of calculating it with including GT.

Figure 11B:
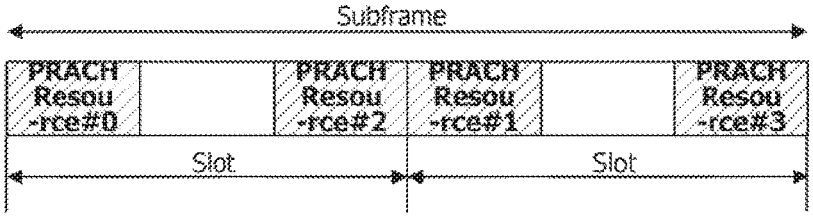

Referring to FIG. 11b, the resource for the new format of PRACH preamble may be aligned based on both boundaries of a slot. In this case, 4 resources may be existed for the new format of PRACH preamble that may be timely existed in a subframe. In this time, a first resource and a second resource (depicted as resource #0 and resource #1) may be aligned to be started from a point where each slot is started in the corresponding subframe, and end points of a third and a fourth resources (depicted as resource #2 and resource #3) may be aligned to be identical to the point where each slot is ended in the corresponding subframe. That is, the third and the fourth resources are aligned to be started from a region forgoing as much as the PRACH preamble length including GT from a point where the corresponding slot is ended, and therefore, the end point of resource may be aligned with a point where each slot is ended. The length of new format of PRACH preamble may be 4832 $T_s$ based on PRACH preamble format 4 when it is calculated with including GT. An index of resource depicted in FIG. 11b is just an example, but sequential mapping of the resources may be differently configured.

Figure 11C:
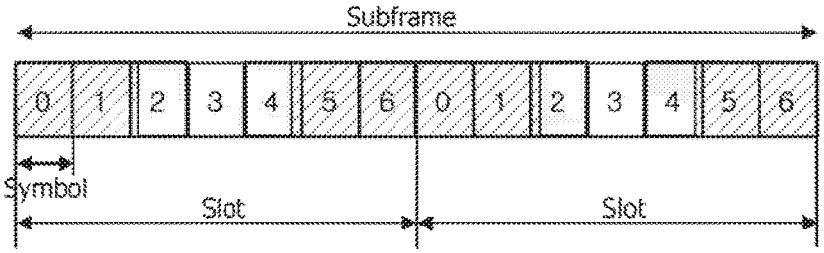

Referring to FIG. 11c, the resource for the new format of PRACH preamble may be aligned based on a bunch of symbols. A number of symbols included in each slot may be changed depending on a type of CP. The type of CP may be estimated by a second system information block (SIB2). For example, in case of normal CP, 7 OFDM or SC-FDMA symbols may be included in a slot. In this case, 3 OFDMA or SC-FDMA symbols are grouped, and a resource for the new format of PRACH preamble may be aligned with a boundary of each group. That is, in normal CP, each resource may be aligned with a boundary for the group which is comprised of first 3 symbols based on each slot and a boundary for the group which is comprised of 3 symbols. As a result, a length of the new format of PRACH preamble may be shorter than a length of 3 symbols in case of normal CP, 4 resources may be existed for the new format of PRACH preamble in a subframe.

Figure 11D:
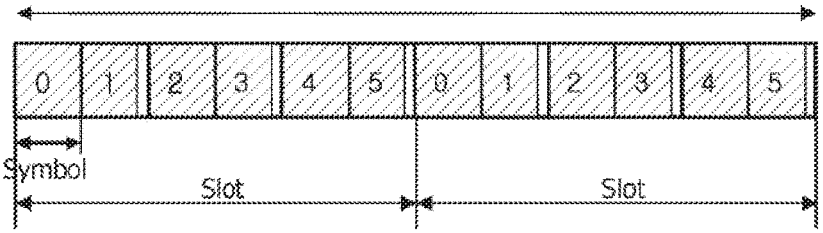

Referring to FIG. 11d, in case of extended CP, 6 symbols may be included in a slot, and in this case, 2 symbols may be grouped, and a resource for the PRACH preamble may be aligned with a boundary of each group. As a result, a length of the new format of PRACH preamble may be shorter than a length of 2 symbols in case of extended CP, and 6 resources may be existed for the new format of PRACH preamble in a subframe.

As described so far, throughout FIG. 11a to FIG. 11d, it is depicted that the resources for the new format of PRACH preamble in a subframe are aligned with a subframe boundary, a slot boundary, or a boundary of a group of symbol, and a predetermined number of resource are included.

As an alternative, a UE may determine a parameter for the number of PRACH, for example, the number of resources that may be existed in a subframe based on $N_{PRACH}$. Herein, the parameter for the number of PRACH, i.e., $N_{PRACH}$ may be pre-designated by the UE or a higher layer, i.e., RRC layer. Herein, as an example of pre-designating $N_{PRACH}$, based on total length (including GT) of the PRACH preamble, there may be a case that a number that may fill in a subframe in the maximum is designated to $N_{PRACH}$. The starting location of resource for the new format of PRACH preamble may be determined as multiple of an integer of total length of the PRACH preamble including GT at the location where the corresponding subframe is ended, and summation of a number of guard sample which is used. In this time, total summation of the gourd samples may be configured such that the summation of total samples for the resource for the new format of PRACH preamble and total sum of gourd samples is the same or fewer than the number of samples that correspond to a subframe.

Also, alternatively, a UE may determine a number of resources that may be existed in a slot according to the parameter $N_{PRACH}$, for the number of the new format of PRACH. Herein, the slot in which the resources for the new format of PRACH preamble may be included may be pre-designated for designated through a higher layer. The starting location of resources for the new format of PRACH preamble is configured as multiple of an integer of total length the PRACH preamble including GT at the location where the corresponding slot is ended, and summation of a number of guard sample which is used.

Meanwhile, the resource for the new format of PRACH preamble is 4832 $T_s$ based on the conventional 3GPP release-10, but may be changed, like the length of CP and GT may be changed according to the cell coverage radius and the maximum delay spread. Also, the number of resource described so far is just an example, but the number of resource may be configured more than the above examples according to the length (including GT) of the new format of PRACH preamble.

In the meanwhile, when generating new PRACH preamble format based on PRACH preamble format 4, a space of subcarrier for the PRACH may be smaller than the existing 7.5 kHz. Also, the space of subcarrier may be inverse multiple of an integer of 15 kHz. For example, when the space of subcarrier is 3.75 (=15/4) kHz, the number of resource block in which the PRACH preamble of the new format occupies may be decreased to 3 RB from 6 RB in comparison with the conventional release-10. In the resource configuration/allocation for the PRACH preamble using the TDM, FDM may be additionally used. In configuring the resource for the PRACH preamble, the case of using FDM only may be considered.

So far, in generating the new PRACH preamble format, it is described based on PRACH preamble format 4, but other new PRACH preamble format may be suggested as an alternative.

<New PRACH Preamble Format>

In case of a radius of the small cell of which needs has been growing recently is within 1 km, propagation delay due to round trip distance (RTD) may be in negligible level. In this time, the matters that can be considered for new PRACH preamble format includes overhead and interference between the PRACH and the PUCCH/PUSCH. In the conventional 3GPP release-10, since the transmission power of the PRACH may be configured to be significantly lower in comparison with that of the PUSCH, the interference degree that the PRACH of a UE influences on the PUSCH of another UE may be low. However, in case of small cell of which needs has been growing recently, since a UE and a cell transmit and receive low transmission power overall, significant interference may influence if the PRACH of a UE uses the same resource of the PUSCH of another UE.

Therefore, in designing the PRACH preamble for the cell of which needs has been growing recently, it may be preferable to configure the PRACH preamble length (including GT) to be within 1 symbol section. Herein, since 1 symbol section is different upon normal CP and extended CP, the length of PRACH preamble may also be differently configured. Meanwhile, the resource for PRACH preamble may be aligned to be started from a region forgoing as much as the PRACH preamble length including GT from a point where the corresponding subframe is ended. The resource for PRACH preamble may be configured to be existed within a region that corresponds to the last symbol of the corresponding subframe. Meanwhile, in order to decrease overhead for the PRACH preamble in the aspect of frequency domain, the PRACH BW that occupied 6 RB based on the PUSCH in the conventional 3GPP release-10 may be adjusted to 2 RB or 3 RB. According to this, ZC sequence for generating sequence of the PRACH preamble can also be improved.

Meanwhile, since such a PRACH preamble may collide with the PUCCH or the PUSCH, a UE should be able to operate for avoiding collision based on the resource for the new PRACH preamble. In case that collision between the PRACH preamble and the PUCCH/PUSCH occurs in a UE, the UE is allowed to use shortened PUCCH/PUSCH in order to fix this, and in case that simultaneous transmission of the PRACH and the PUCCH/PUSCH is configured, the simultaneous transmission may be performed with the PRACH by using the shortened PUCCH/PUSCH. In other case, after configuring priority in the order of PUCCH, PRACH and PUSCH, a part of the information is dropped.

Meanwhile, the PRACH preamble transmitted by a UE and the PUCCH/PUSCH transmitted by another UE may collide. In order to prevent such a collision, in case that the resource for the PUCCH or the PUSCH includes all or a part of the resource for the PRACH preamble, the UE may use the shortened PUCCH/PUSCH. Also, when the PRACH based on grant collides with the PUCCH/PUSCH, the UE may use the shortened PUCCH/PUSCH. Herein, the PRACH based on grant may be limited to the PRACH transmission by the PDCCH.

Meanwhile, in case that the PUCCH and the PUSCH are transmitted simultaneously in a slot, the standard of which the PRACH is transmitted may be extended to a unit of slot, not a unit of symbol. In this case, if the PUCCH/PUSCH configuration scheme collides with the resource allocation scheme for the PRACH preamble, the PUCCH/PUSCH configuration scheme may be changed to be based on slot.

Hereinafter, the exceptional case in which a UE may transmit the new PRACH preamble on DL, not UL will be described.

<Transmission of New PRACH Preamble Through DL Subframe>

According to an embodiment suggested by the present specification, a UE may transmit the PRACH preamble through a part of region of DL subframe where UE-common such as CRS/CSI-RS or cell-specific RS is not transmitted. Herein, the part of region of the corresponding DL subframe may include the remainder region (a region where there is no MBSFN signal transmission) except a partial (1-2) symbol which is front part of the DL subframe which is configured to be MBSFN subframe.

Also, in case of new carrier type (NCT) of which a common reference signal (RS) is not transmitted for every DL subframe, a DL subframe (or a special subframe) in which the CRS/CSI-RS and RS for tracking are not configured to be transmitted may be included. In case of the NCT, a region of DL subframe in which the PRACH preamble may be transmitted may be limited to a region that corresponds to OFDM symbols which are fewer than the symbols indicated by the signal $I_{DataStrat}$ of a higher layer that indicates to a number of PDCCH OFDM symbol. The reason of such limitation is because the PDCCH may not transmitted in the corresponding region in order to decrease or eliminate interference in the PDCCH region of the existing carrier by the NCT. In more distinctively, a region (region also including UpPTS) except a part of symbol in front part in DwPTS of a special subframe (where CSI-RS is not configured) in TDD system may also be included in DL region which is available to configure the corresponding PRACH (although the CRS may be included, but by omitting the PDSCH scheduling for all UEs).

Hereinafter, a method for configuring/signaling will be described such that a UE may use the new format of PRACH preamble.

<Method for Configuring/Signaling for New Format of PRACH Preamble>

If the next system does not allow for an access of the existing UE for the cell of which needs has been growing recently, a resource and a configuration for the new format of PRACH preamble may be freely performed. However, since the existing format of PRACH preamble and the new format of PRACH preamble should be operated together in order to allow an access of the existing UE, an additional procedure is required.

Based on the conventional release-10, the configuration and prach-FrequencyOffset $n_{PRBoffset}^{RA}$ of a UE for the PRACH preamble are indicated in cell-specific manner, and through this, an eNodeB was able to allocate a resource for the PRACH preamble to the UE. In the next system, two or more configurations of UE for the PRACH preamble and PRB offsets are to be included. That is, each cell may support all of the configurations for the PRACH preamble of the format based on the existing release-10 and the configurations for the PRACH preamble of new format. Herein, the configurations of UE for the PRACH preamble and PRB offset for the new format of PRACH preamble may be extended for the object that the UE may perform a specialized access and the object except for the UL synchronization tracking use and communication between eNodeB and UE for the cell of which needs has been growing recently. For the convenience of description, it will be described by assuming the situation of including 2 configurations and PRB offsets for a cell. In addition, for the convenience of description, it may be assumed that the configuration which is additionally instructed to a UE is not overlapped with that of the existing PRACH preamble format, and is set for the configuration that corresponds to new PRACH preamble format in the next system.

Method for Signaling a Plurality of Configurations for the PRACH Preamble to a UE In the new PRACH preamble format, a UE is signaled to use the subset of a part which is not currently used among the PRACH preamble configuration indices for each of FDD and TDD. Based on release-10, in FDD, a UE is signaled by using configuration index 30, 46, 60, 61 and 62 shown in Table 3. And in TDD, a UE is signaled by using configuration index 58, 59, 60, 61, 62 and 63. Or, the configuration for the new PRACH preamble format may be signaled to a UE through a separate table.

Among the plurality of configurations and PRB offsets for the PRACH preamble, all or a part may be instructed by RRC signaling or instructed dynamically. The configuration for the PRACH preamble may represent the resources for the PRACH preamble in which the PRACH preamble may be transmitted (for example, location/timing where/when the PRACH preamble is stared within the same subframe may be included). And an example of dynamic instructing is to use of instructing by the PDCCH.

Figure 12A:
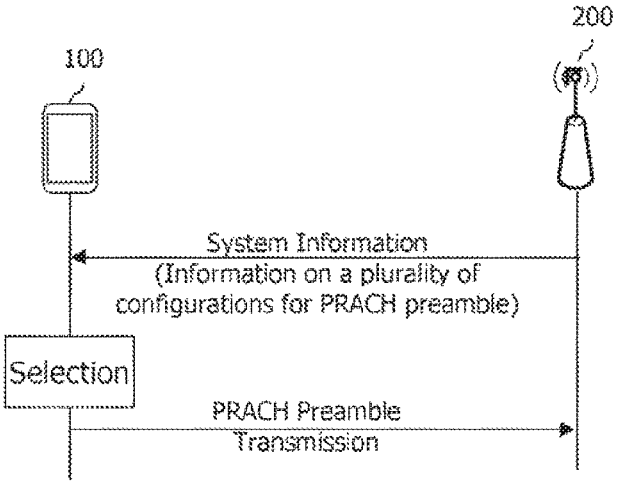
FIGS. 12a and 12b illustrate a method for notifying configuration for the PRACH preamble to a UE.
Figure 12B:
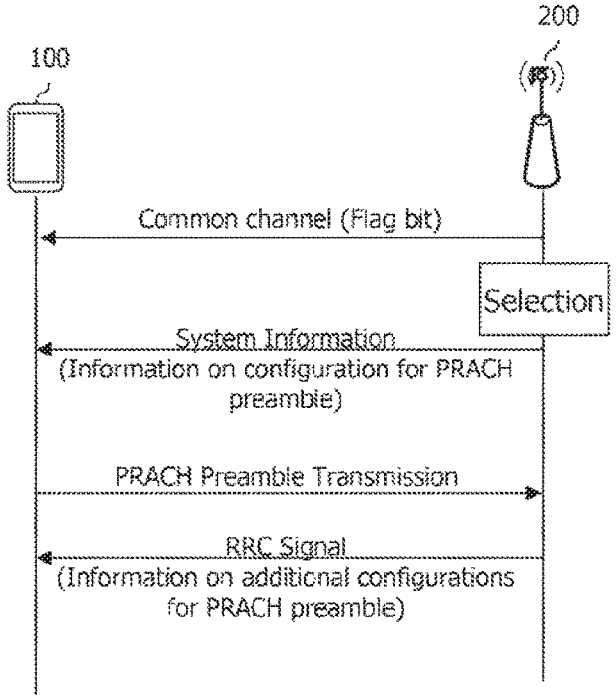

FIGS. 12a and 12b Illustrates a Method for Notifying Configuration for the PRACH Preamble to a UE.

As known by referring to FIGS. 12a and 12b, detailed example of the methods in which an eNodeB notifies two PRACH preamble configurations to a UE is shown.

As a first method, as known by referring to FIG. 12a, 2 configurations for the PRACH preamble may be signaled to the UE through the system information that the eNodeB transmits. In this case, even if trying to perform initial access, the UE may select one of 2 configurations for the PRACH preamble and perform it.

As a second method, as known by referring to FIG. 12b, by transmitting flag bit to a UE through the channel which is common to all UE, whether the corresponding cell is a cell having small coverage may be notified to the UE, and in addition, by selecting one of a plurality of configurations for the PRACH preamble, the selected configurations may be notified to the UE through the system information. Later, the remainder configurations for the PRACH preamble may be notified to the UE through RRC signal or dynamically. Herein, the common channel may be PBCH, and the bits which are not currently used in the PBCH may be used as the flag bit.

A setting method for additional PRB offset may be set such that the resource for the PRACH preamble which is additional to the resource for the PRACH preamble for the existing UE is to be subset in order to minimize or eliminate increase of overhead for managing 2 configurations for the PRACH preamble by a cell. For example, for the resource for the additional PRACH preamble, the value of PRB offset for legacy UE and additional PRB offset may be identically configured in case that the resource has BW that corresponds to 6 RB based on the PDSCH.

<Method for Distinguishing a Plurality of PRACH Preambles on the Same Resource>

Figure 13:
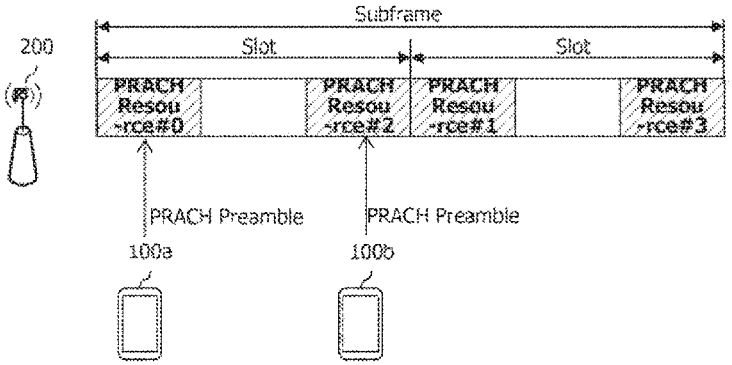
FIG. 13 illustrates an example in which a plurality of preambles is transmitted in a subframe.

In the conventional 3GPP release-10, RA-RNTI is used to distinguishing PRACH preambles. However, since the RA-RNTI distinguishes them based on the subframe to which the PRACH preamble is transmitted, as shown in FIG. 13, in case that a plurality of the PRACH preamble of new format is transmitted on a subframe, an eNodeB may not distinguish from which UE each PRACH preamble is transmitted.

In order to solve such a problem, according to an example of the present specification, the existing RA-RNTI can be improved. The improved RA-RNTI is calculated by additionally considering a resource index for the PRACH preamble in the same subframe in addition to the subframe index where the PRACH preamble is started and the index for the frequency domain. That is, possible values for the RA-RNTI may be extended from the existing 0001-0003C to 0001-FFF3. In this case, for the PRACH preamble which is transmitted through the resource for another PRACH preamble in the same subframe, RAR may be transmitted through the PDSCHs different from each other.

Alternately, according to an example of the present specification, in case that a plurality of UEs transmit the PRACH preamble through the same frequency domain and the resource for different PRACH preambles in the same subframe, RA-RNTI is generated based on the conventional 3GPP release-10, but an eNodeB distinguishes UEs by using the reserved field that comprises the (e–) PDCCH for MSG2. Herein, the reserved field may be corresponds to HARQ process or DAI based on 3GPP release-10. And in order to distinguish UEs, the resource index for the PRACH preamble in the same subframe may be used. In this case, for the PRACH preamble which is transmitted through the resource for another PRACH preamble in the same subframe, RAR may be transmitted through the PDSCHs different from each other.

As another alternative, for the PRACH preamble which is transmitted through the resource for different PRACH preamble in the same subframe, RA-RNTI is generated based on the conventional 3GPP release-10, and also in case that the RAR may be transmitted through the same PDSCH, the UEs that transmit respective PRACH preambles may be distinguished by higher layer in the same subframe. Herein, the higher layer may be MAC layer. MAC layer may distinguish them by using a predefined pattern among RAR bundle for the resource for each PRACH preamble, and may add a field for distinguishing resources for the PRACH preamble in each subheader.

As still another alternative, RA-RNTI is generated based on the existing Release-10, the PDCCH candidate is differently configured within common search space (CSS) to which the PDCCH that corresponds to RAR is transmitted, according to the resource for the PRACH preamble. For example, in case that there are 4 resources (starting location/time) for the PRACH preamble in a subframe, each PDCCH that corresponds to RAR may be mapped to the respective 4 PDCCH candidates of which aggregation level is 4 (in CSS), and reversely, the UE estimates the resource for the PRACH preamble which is used for transmitting the PRACH preamble through the CSS (according to through which PDCCH candidate PAR is scheduled in the corresponding SS). In this case, for the PRACH preamble which is transmitted through the resource for another PRACH preamble in the same subframe, RAR may be transmitted through the PDSCH different from each other. As such, in case that RAR is transmitted through a plurality of PDSCHs, each PDSCH may be transmitted through different subframes.

<Procedure of UE According to a Plurality of PRACH Preambles>

Basically, the resources for the PRACH preamble that corresponds to 2 configurations may be allocated such that overlapped section occurs. Herein, the resources for the new format of PRACH preamble may be allocated as subset with respect to the resource for the PRACH preamble that corresponds to the existing configuration. The subframe or slot that corresponds to the resource for the new format of PRACH preamble may be allocated to be overlapped from the last subframe among a bundle of subframes that corresponds to the resource for the existing format of PRACH preamble. The reason for such allocation is to increase an overlapped part with GT that corresponds to the resource for the existing format of PRACH preamble in the resource for the new format of PRACH preamble. For example, in case of the existing PRACH preamble format 3, it may be configured that a bundle of subframes that corresponding to the resource for the PRACH preamble is comprised of 3 subframes, and the resource for the new format of PRACH preamble is overlapped from a third subframe in the bundle.

Meanwhile, in the next system, according to whether a UE that access a cell supports the new format of PRACH preamble, it may be allowed that each cell has a plurality of configurations for the PRACH preamble, or has one configuration for the PRACH preamble like the conventional release-10. According to situation or object, the plurality of configurations for the PRACH preamble may be used together.

Hereinafter, in a situation that a UE uses a plurality of configurations for the PRACH preamble in the same resource, examples of method for selecting a single configuration will be described. Basically, it is assumed that there is no situation that a UE uses both two configurations in the same resource.

As a first method, a higher layer of eNodeB notifies a configuration for the PRACH preamble which is usable among subframe or a bundle of subframes. That is, the higher layer of eNodeB notifies a plurality of configurations for the PRACH preamble, and each configuration may be used in a specific subframe or a specific bundle of subframes.

As a second method, a UE preferentially selects the configuration that corresponds to the new format of PRACH preamble among the plurality of configurations for the PRACH preamble.

As a third method, the configuration for the PRACH preamble that a UE will use is known to the UE by an instruction of the PDCCH. For example, by using a reserved field of the PDCCH as a flag bit, the configuration may be notified to the UE. Herein, the reserved bit may be a part of values configured as zero. In other cases, the UE preferentially selects the configuration that corresponds to the new format of PRACH preamble.

The contents described so far may be implemented by hardware. This will be described with reference to FIG. 14.

Figure 14:
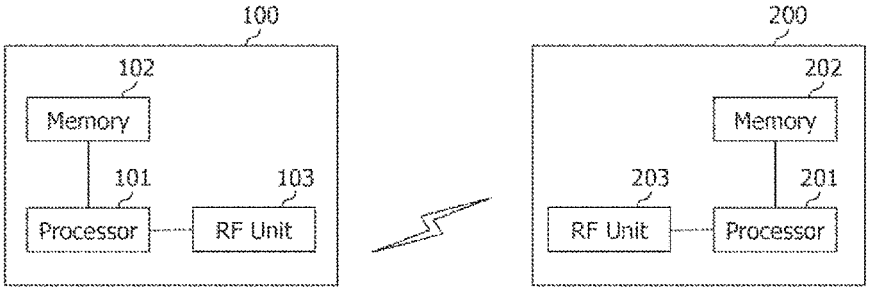
FIG. 14 is a block diagram showing a wireless communication system in which an embodiment of the present invention is implemented.

FIG. 14 is a Block Diagram Showing a Wireless Communication System to Implement an Embodiment of the Present Invention.

The base station 200 a processor 201, memory 202, and an RF unit 203. The memory 202 is connected to the processor 201 and configured to store various information used for the operations for the processor 201. The RF unit 203 is connected to the processor 201 and configured to send and/or receive a radio signal. The processor 201 implements the proposed functions, processed, and/or methods. In the described embodiments, the operation of the eNodeB may be implemented by the processor 201.

A wireless device 100 includes a processor 101, memory 102, and a radio frequency (RF) unit 103. The memory 102 is connected to the processor 101 and configured to store various information used for the operations for the processor 101. The RF unit 103 is connected to the processor 101 and configured to send and/or receive a radio signal. The processor 101 implements the proposed functions, processed, and/or methods. In the described embodiments, the operation of the wireless device may be implemented by the processor 101.

The processor may include Application-Specific Integrated Circuits (ASICs), other chipsets, logic circuits, and/or data processors. The memory may include Read-Only Memory (ROM), random access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

[1. A method for performing random access by a user equipment for a cell, the method comprising:

receiving, via the cell, a plurality of configurations for a random access preamble;

selecting one of the plurality of configurations;

transmitting, via the cell, the random access preamble according to a selected configuration; and receiving a random access response including a Random Access-Radio Network Temporary Identifier (RA-RNTI), wherein the random access preamble is transmitted according to the selected configuration on at least one resource in a subframe including a plurality of resources on which the random access preamble is capable of being transmitted, wherein the random access preamble transmitted on the at least one resource is uniquely distinguishable, and wherein the RA-RNTI is calculated based on an index of the subframe and a location index of the at least one resource in the subframe on which the random access preamble is transmitted according to the selected configuration.]

[2. The method of claim 1, wherein locations of the plurality of resources are aligned with a boundary of the subframe.]

[3. The method of claim 1, wherein locations of the plurality of resources are aligned with a boundary of each slot in the subframe.]

[4. The method of claim 1, wherein locations of the plurality of resources are aligned with a boundary of a group of Orthogonal Frequency Division Multiple Access (OFDMA) or Single Carrier-Frequency Division Multiple Access (SC-FDMA) symbols in the subframe.]

[5. The method of claim 4, wherein a length of the random access preamble transmitted on the resource is shorter than a length of 3 OFDMA or SC-FDMA symbols in case of normal Cyclic Prefix (CP), and is shorter than a length of 2 OFDMA or SC-FDMA symbols in case of extended CP.]

[6. The method of claim 1, wherein the plurality of configurations are received through system information.]

[7. The method of claim 1, wherein the plurality of configurations include a configuration of format 0 to 4 for a Physical Random Access Channel (PRACH) preamble and a configuration of a new format for the PRACH preamble which is designed to support coverage of the cell.]

[8. The method of claim 7, wherein the new format is generated based on format 4 for the PRACH preamble which is designed to support cell coverage of 1.4 km.]

[9. The method of claim 7, wherein when the one of the plurality of configurations is selected, the user equipment selects a configuration of the new format which is designed to support the coverage of the cell.]

[10. The method of claim 1, wherein the subframe is downlink subframe.]

[11. The method of claim 1, wherein the cell is a pico cell, a femto cell, a Home (e)NodeB or a Closed Subscriber Group (CSG) cell.]

[12. A user equipment (UE) for performing random access for a cell, the UE comprising:

a radio frequency (RF) unit configured to receive, via the cell, a plurality of configurations for random access preamble; and a processor configured to control the RF unit to:

select one of the plurality of configurations, transmit, via the cell, the random access preamble according to the selected configuration, and receive a random access response including a Random Access-Radio Network Temporary Identifier (RA-RNTI), wherein the random access preamble is transmitted according to the selected configuration on at least one resource in a subframe including a plurality of resources on which the random access preamble is capable of being transmitted, wherein the random access preamble transmitted on the at least one resource is uniquely distinguishable, and wherein the RA-RNTI is calculated based on an index of the subframe and a location index of the at least one resource in the subframe on which the random access preamble is transmitted according to the selected configuration.]

[13. The UE of claim 12, wherein locations of the plurality of resources are aligned with a boundary of the subframe.]

[14. The UE of claim 12, wherein locations of the plurality of resources are aligned with a boundary of each slot in the subframe.]

[15. The UE of claim 12, wherein locations of the plurality of resources are aligned with a boundary of a group of Orthogonal Frequency Division Multiple Access (OFDMA) or Single Carrier-Frequency Division Multiple Access (SC-FDMA) symbols in the subframe.]

*16. A method of performing random access by a user equipment for a cell, the method comprising:*

*transmitting, to a cell, a random access preamble; and*

*receiving a random access response based on a Random Access-Radio Network Temporary Identifier (RA-RNTI),*

*wherein the random access preamble is transmitted on at least one time resource in a subframe,*

*wherein the subframe comprises at least one slot comprising a plurality of orthogonal frequency division multiplexing (OFDM) symbols,*

*wherein a location of at least one among the plurality of OFDM symbols is aligned with a boundary of the at least one slot in the subframe, and*

*wherein the RA-RNTI is calculated based on (i) a first index related to the subframe, (ii) a second index of the at least one time resource in the subframe on which the random access preamble is transmitted, and (iii) a third index for a frequency domain location of the random access preamble.*

*17. The method of claim 16, wherein a length of the random access preamble transmitted on the at least one time resource is shorter than a length of 3 OFDMA or SC-FDMA symbols in case of normal Cyclic Prefix (CP), and is shorter than a length of 2 OFDMA or SCFDMA symbols in case of extended CP.*

*18. The method of claim 16, further comprising:*

*receiving, from the cell, information regarding a plurality of configurations for the random access preamble; and*

*selecting a configuration among the plurality of configurations,*

*wherein the random access preamble is based on the selected configuration.*

*19. The method of claim 18, wherein the information regarding the plurality of configurations is received through system information.*

*20. The method of claim 18, wherein the plurality of configurations comprises a configuration of format 0 to 4 for a Physical Random Access Channel (PRACH) preamble and a configuration of a new format for the PRACH preamble which is designed to support coverage of the cell.*

*21. The method of claim 20, wherein the new format is generated based on format 4 for the PRACH preamble which is designed to support cell coverage of 1.4 km.*

*22. The method of claim 20, wherein based on the configuration among the plurality of configurations being selected, the user equipment selects a configuration of the new format which is designed to support the coverage of the cell.*

*23. The method of claim 16, wherein the subframe is downlink subframe.*

*24. The method of claim 16, wherein the subframe comprises fourteen OFDM symbols.*

*25. The method of claim 16, wherein the at least one slot in the subframe comprises a plurality of slots that are indexed by slot numbers.*

*26. A user equipment (UE) configured to perform random access for a cell, the UE comprising:*

*a radio frequency (RF) unit;*

*at least one processor; and*

*at least one computer memory that is operably connectable to the at least one processor and that has stored thereon instructions which, when executed, cause the at least one processor to control the RF unit to perform operations comprising:*

*transmitting, to a cell and via the RF unit, a random access preamble, and*

*receiving, via the RF unit, a random access response based on a Random Access-Radio Network Temporary Identifier (RA-RNTI),*

*wherein the random access preamble is transmitted on at least one time resource in a subframe,*

*wherein the subframe comprises at least one slot comprising a plurality of orthogonal frequency division multiplexing (OFDM) symbols,*

*wherein a location of at least one among the plurality of OFDM symbols is aligned with a boundary of the at least one slot in the subframe, and*

*wherein the RA-RNTI is calculated based on (i) a first index related to the subframe, (ii) a second index of the at least one time resource in the subframe on which the random access preamble is transmitted, and (iii) a third index for a frequency domain location of the random access preamble.*

*27. The UE of claim 26, wherein the operations further comprise:*

*receiving, via the cell, information regarding a plurality of configurations for the random access preamble; and*

*selecting a configuration among the plurality of configurations,*

*wherein the random access preamble is based on the selected configuration.*

*28. The UE of claim 27, wherein the information regarding the plurality of configurations is received through system information.*

*29. A method of performing random access by a user equipment for a cell, the method comprising:*

*transmitting, to a cell, a random access preamble; and*

*receiving a random access response based on a Random Access-Radio Network Temporary Identifier (RA-RNTI),*

*wherein the random access preamble is transmitted on at least one resource in a subframe,*

*wherein the subframe comprises a plurality of slots each comprising a plurality of orthogonal frequency division multiplexing (OFDM) symbols,*

*wherein a location of at least one among the plurality of OFDM symbols is aligned with a boundary of at least one slot among the plurality of slots in the subframe, and*

*wherein the RA-RNTI is calculated based on (i) a resource index among a plurality of resource indices in a time domain that are incremented at each slot boundary in the plurality of slots in the subframe in which the random access preamble is transmitted, and (ii) a frequency domain index for the random access preamble.*

*30. The method of claim 29, wherein the resource index is incremented at starting points of each slot in the plurality of slots in the subframe.*

* * * * *